United States Patent [19]

Rayburn

[11] Patent Number: 4,696,125
[45] Date of Patent: Sep. 29, 1987

[54] CASTING FLOAT WITH LINE STOP

[76] Inventor: Walter Rayburn, P.O. Box 892, Loveland, Colo. 80539-0892

[21] Appl. No.: 390,130

[22] Filed: Jun. 18, 1982

[51] Int. Cl.[4] ............................................. A01K 93/00
[52] U.S. Cl. ................................... 43/43.14; 43/43.15; 43/44.9
[58] Field of Search ................. 43/43.14, 43.15, 43.1, 43/44.87, 44.88, 44.9, 44.92, 44.95; 24/129 B

[56] References Cited

U.S. PATENT DOCUMENTS

| | | | |
|---|---|---|---|
| 786,597 | 4/1905 | Picken . | |
| 2,483,788 | 10/1949 | Smith . | |
| 2,726,474 | 12/1955 | Soskice | 43/43.14 |
| 2,729,015 | 1/1956 | Finnegan | 43/44.9 |
| 2,952,937 | 9/1960 | Wassing | 43/43.15 |
| 2,992,508 | 7/1961 | Schmidt . | |
| 3,019,546 | 2/1962 | Hansen . | |
| 3,273,278 | 9/1966 | Lynch | 43/44.87 |
| 3,714,923 | 2/1973 | Mariani | 43/17 X |
| 3,744,176 | 7/1973 | Bondhus | 43/44.87 X |
| 3,911,610 | 10/1975 | Goodman | 43/43.1 |
| 3,990,172 | 11/1976 | Hagquist | 43/43.14 |
| 4,200,190 | 4/1980 | Tyson | 43/44.95 X |
| 4,418,492 | 12/1983 | Rayburn | 43/44.9 |

*Primary Examiner*—Nicholas P. Godici
*Attorney, Agent, or Firm*—Hugh H. Drake

[57] ABSTRACT

A water fillable casting float includes a hollow shell with an interior tube that mates with a conduit defined as a plug. Mating slits allow mounting of the assembly upon a fishing line. A valve structure permits allowing water to enter the float in order to adjust its, thus, weight and ultimate depth of position in the water. Another valve accommodates that approach. A line stop, mountable upon a fishing line, also cooperates with the float. It features a staggered arrangement of line-receiving openings.

3 Claims, 3 Drawing Figures

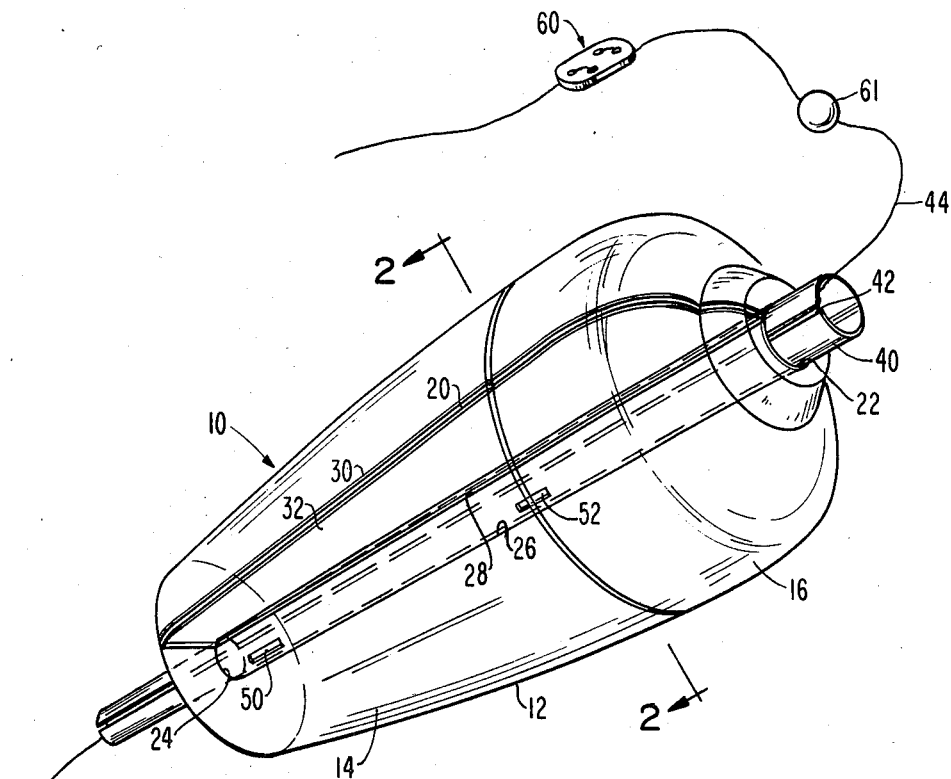
FIG. 1
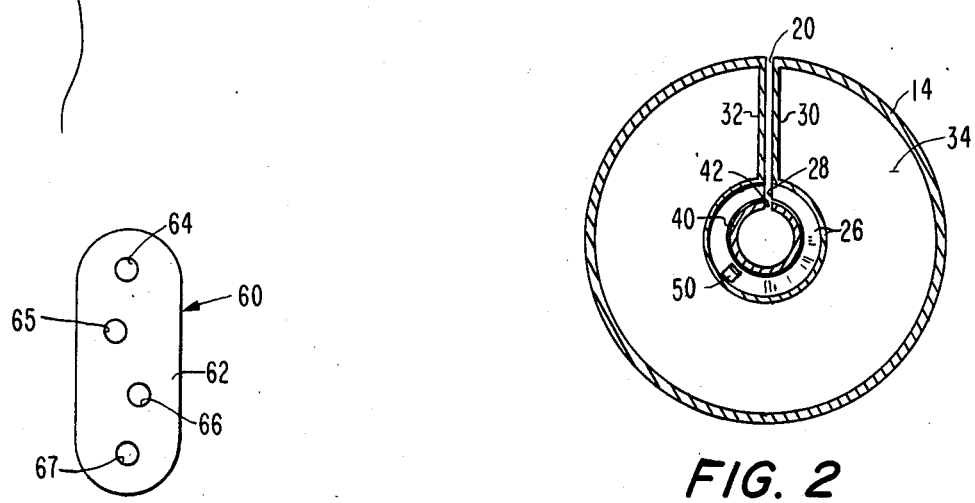
FIG. 3
FIG. 2

CASTING FLOAT WITH LINE STOP

The present invention has to do with fishing apparatus. More particularly, it pertains to a casting float as well as to a related line stop.

The prior art has disclosed numerous fishing floats. Many are deficient in that their use requires cutting the fishing line or otherwise adapting a continuation of such a line in order to mount the float. Nevertheless, a number of approaches have been suggested for allowing the user to mount the float more conveniently. These include the disclosures of U.S. Pat. Nos. 2,729,015, 3,019,546, 2,483,788, 786,597 and 2,992,508.

In normal use, the float also requires the application of a line stop, applied to the line above or below the float. Typical forms are shown in U.S. Pat. No. 3,714,923 and 3,911,610. Line stops, as disclosed by those patents, suffer from the fact that strict attention must be paid to the formation and size of apertures provided in the stop in order to receive the line. No one such line stop, especially in the latter case, is capable of handling a variety of lines that differ significantly in diameter.

With regard to floats, there is seldom any adjustment therein for accommodating their water-displacement, and thus allowing them to be used for adjusting ultimate depth in the water of the lure. An exception to that is to be found in U.S. Pat. No. 3,744,176. In the latter, a plug may be selectively removed in order to allow a desired amount of water to enter an outer shell of the float and, thereby, affect its degree of bouyancy and its weight for casting.

Notwithstanding the aforementioned improvements in the art, a committed fisherman never stops seeking further improvement. Accordingly, it is a general object of the present invention to provide a new and improved structure for fishing that overcomes deficiencies which appear in the prior art.

One particular object of the present invention is to provide a new and improved fishing-line stop in which line-receiving apertures need not have sizes which match the line thickness.

Another object of the present invention is to provide a new and improved fishing float that allows both a secure but slip-type of mounting, without having to sever or otherwise especially handle a fishing-line, and yet which also allows adjustable depth and weight control.

In accordance with the present invention, a new casting float includes a hollow shell that has openings at respective opposite ends thereof and has a slit formed in its wall. A tube longitudinally extends internally of the shell and is joined at opposing ends to define an open path from one opening to the other. Generally-radial parallel-spaced walls extend from corresponding margins of the slit to the wall of the tube. A conduit is formed to fit frictionally within the tube, with the interior diameter of the conduit accommodating a slip-fit upon a fishing line. Defined longitudinally in the wall of the conduit are accepting means for admitting the line from the slit into the interior of the conduit. This permits captivation of the line within the conduit upon misalignment of the accepting means relative to the slit. At least one aperture is defined in the wall of the tube. That aperture serves as a vent to allow water to flow into or out of the interior of the shell, but the aperture is closed upon fitting of the conduit in place within the tube.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an isometric view showing a casting float combined with a line stop and mounted upon a fishing line;

FIG. 2 is a cross-sectional view taken along the line 2—2 in FIG. 1; and

FIG. 3 is an enlarged plan view of the line stop shown in FIG. 1.

A casting float 10 includes a hollow shell 12 molded of a plastic material which very preferably is transparent in order to allow the user to be able to see into the interior of the shell. For the convenience of practical molding procedures which enable the formation of other elements yet to be described, shell 12 is composed of a main body portion 14 and an end cap 16 secured over and in engagement with an open end of portion 14. Although that engagement could be met by way of a snap-type interfitting that is reasonably water-tight, it is preferred that cap 16 be more permanently secured in place on portion 14 by such means as cementing, spin-welding or ultrasonic bonding.

Formed longitudinally in the wall of shell 12 is a slit 20. Defined in opposing ends of shell 12 are respective openings 22 and 24. A tube 26, which is oriented longitudinally and centrally of shell 12, is secured at one end into opening 22 and at its other end into opening 24. Formed in tube 26 is a longitudinal slit 28 which is aligned radially beneath slit 20. Connecting the margins of slits 20 and 28 are generally-radial parallel-spaced walls 30 and 32, so as to define a continuation of slit 20 interiorly through the wall as tube 26 and leave an otherwise hollow space 34 within shell 14.

A conduit 40 is sized and formed to fit frictionally into tube 26 like a plug. To that end, conduit 40 preferably also is molded from a plastic and both tube 26 and conduit 40 are correspondingly tapered as illustrated in FIG. 1. Formed longitudinally throughout the length of conduit 40 is still another slit 42. As shown in FIG. 1, conduit 40 has been plugged into place with slit 42 misaligned with slit 28. In FIG. 2, however, slit 42 is positioned so as to be in alignment with slit 28 and thus with slit 20. This allows the user to mount float 10 upon a fishing line 44 (or similarly dismount the float at a later time) by longitudinally unseating conduit 40 just enough to allow it to be twisted so as to establish an alignment between the different slits. After line 44 is positioned within conduit 40, conduit 40 is plugged into place with slit 42 misaligned with slit 28. That captivates line 44 in place.

Also formed at an intermediate position along the length of tube 26 is a first vent 50 which extends through the wall thereof. With or without line 44 already having been captivated, conduit 40 can be rotated as before so as to align vent 50 with slit 42. With that orientation, or with conduit 40 entirely or partially removed, the user need only immerse shell 12 below the surface of water in order to allow that water to flow through slits 20 and 28, or into either or both of openings 22 and 24, and through vent 50 into the interior of shell 12. In consequence, the user may allow water to fill space 34 to whatever extent is desired for establishing the weight, for casting and the bouyancy level beneath the surface, of float 10.

Of course, the entry of water through vent 50 into space 34 would be limited in flow unless air being displaced were vented. Such venting may be accomplished simply by maintaining conduit 40 in at least a "loose" position within tube 26 so as to allow an escape of air. Preferably, however, a second vent 52 is disposed through the wall of tube 40 and spaced apart from vent 50 along the length of the tube. Vent 52 is aligned longitudinally with vent 50. This allows the user to immerse a portion of shell 12 within the water, so that water may enter, and yet allow vent 52 to be similarly aligned with slits 20 and 28 so as to allow the escape of air as space 34 is filled to the desired level.

As illustrated in FIG. 1, fishing line 44 continues through the float to a lower end 56 at least to a lure or bait. Upon casting the lure and line outwardly by use of a fishing pole or rod, float 10 is adjacent to that ultimate attraction for the fish. Once the lure and float have settled into the water, float slips on line portion 56 upwardly toward its position of bouyant stability. At the same time, line 44, by reason of weight of the lure, tends to be drawn through float 10. For adjusting the additional depth below float 10 by which the lure is ultimately suspended, a line stop 60 is mounted upon line 44. Preferably located between line stop 60 and float 10 is a bead 61 which results, in use, of a separation of stop 60 from what becomes the upper end of conduit 40.

Line stop 60 is a generally flat plate of a material, such as a plastic, which is laterally flexible with respect to its major plane. Defined in plate 62 are a plurality of openings 64-67 which extend through the plate. Each of the openings 64-67 is of a diameter sufficient to allow easy, free sliding of plate 62 along line 44 when the latter is relaxed from tension and after the line has been threaded serially through the succession of those openings. Openings 64-67 are arranged in a staggered pattern from one end of plate 62 to the other, and each opening is a circumferentially-closed hole. Accordingly, the application of tension in the line traps plate 62 against movement along line 44 by reason of friction between the line and the surfaces of the stop under the effect of the forces induced by the developed tension in the line that laterally flexes plate 62.

As shown, the opposing ends, in the direction of line 44, of plate 62 are rounded inwardly toward the line. That allows the avoidance of snagging with the reel or guides on the fishing rod as the line stop and float assembly is retrieved by the user. Openings 64-67 are sufficiently large to permit easy threading of a variety of lines serially through their extent when plate 62 is unflexed. Yet, the flexing of plate 62 under tension serves as a positive stop, even though the diameter of the line may be substantially less than that of the diameters of those openings. Preferably, openings 64-67 are sufficiently large to readily accept a twenty-pound-test line; yet, the same openings all of the same size, enable use with a much thinner two-pound-test-line.

In use, line stop 60 is inserted on the line before or after attaching the lure or other fish-attracting device. Thereafter, it may be left on the line, because it is of sufficiently small size as to be capable of being withdrawn, during a reeling in of the line, through the guides on the fishing pole and even into the reel. Once float 10 has been mounted, however, line stop 60 is moved into a postion, indicted above, so as to adjust the depth of the lure or other device below float 10 after both are cast out and allowed to settle into the water. The arrangement allows float 10 to be mounted directly upon the line without any other manipulation of that line. The float itself conveniently permits freely-adjustable determination of its weight and bouyancy. That allows the float selectively to be permitted to float either on the surface or at a desired depth below. At the same time, it permits the depth of the lure or other device to be correspondingly adjusted to a selected elevation below float 10 by means of the positioning of line stop 60. On the other hand, float 10 may be used with a different kind of line stop, or line stop 60 may be used with a different kind of float.

While a particular embodiment of the invention has been shown and described, and alternatives have been suggested, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. A fishing float that comprises:
   a hollow shell that has openings at respective opposite ends thereof;
   a slit formed longitudinally in the wall of said shell;
   a tube longitudinally extending internally of said shell and joined to said shell at opposing ends to define an open path from one of said openings to the other;
   means defining generally-radial parallel-spaced walls that extend from corresponding margins of said slit through the wall of said tube;
   a conduit sized and formed to fit frictionally within said tube, the interior diameter of said conduit accommodating a slip-fit upon a fishing line;
   accepting means defined longitudinally in the wall of said conduit for admitting said line from said slit into the interior of said conduit, permitting captivation of said line within said conduit upon misalignment of said accepting means relative to said slit;
   an aperture defined in the wall of said tube intermediate said openings, said aperture serving as a vent to allow water to flow into or out of the interior of said shell but said aperture being closed by said conduit upon fitting of the latter in place within said tube.

2. A fishing float as defined in claim 1 which further includes a second aperture in the wall of said tube intermediate said openings and longitudinally displaced from the first of said apertures.

3. A fishing float as defined in claim 2 in combination with a fishing line stop that comprises:
   a generally flat plate of a material laterally flexible with respect to the major plane thereof;
   means defining a plurality of openings through said plate, each of said openings having a diameter sufficient to permit free sliding of said plate along a fishing line relaxed from tension and threaded serially through the succession of said openings;
   said openings being arranged in a staggered pattern from one end of said plate to the other, whereby the application of tension in said line traps said plate against movement along said line by reason of friction between said line and the surfaces of said plate under the effect of forces induced by developed tension in said line that laterally flexes said plate;
   said line stop fixing the position of said float upon said line.

* * * * *